(12) United States Patent
Krah

(10) Patent No.: US 7,144,045 B2
(45) Date of Patent: Dec. 5, 2006

(54) ELECTROFUSION SOCKET FORMING SYSTEM

(75) Inventor: Karl-Heinz Krah, Daaden-Bierdorf (DE)

(73) Assignee: Karl-Heinz Krah GmbH, Schutzbach (DE)

( * ) Notice: Subject to any disclaimer, the term of this patent is extended or adjusted under 35 U.S.C. 154(b) by 0 days.

(21) Appl. No.: 10/861,489

(22) Filed: Jun. 7, 2004

(65) Prior Publication Data

US 2004/0222627 A1    Nov. 11, 2004

Related U.S. Application Data

(62) Division of application No. 09/935,337, filed on Aug. 23, 2001, now Pat. No. 6,781,099.

(60) Provisional application No. 60/274,661, filed on Mar. 12, 2001.

(51) Int. Cl.
  *F16L 47/02* (2006.01)
  *H05B 3/06* (2006.01)
  *B29C 65/00* (2006.01)

(52) U.S. Cl. .................... 285/21.2; 285/21.1; 219/542; 219/544; 156/304.2

(58) Field of Classification Search ............... 285/21.1, 285/21.2; 219/535, 542, 544; 156/304.2
See application file for complete search history.

(56) References Cited

U.S. PATENT DOCUMENTS

| | | | |
|---|---|---|---|
| 3,061,503 A | 10/1962 | Gould et al. | |
| 3,062,940 A | 11/1962 | Bauer et al. | |
| 3,112,771 A | 12/1963 | Bringolf et al. | |
| 3,422,179 A * | 1/1969 | Holzer ............ | 264/272.14 |
| 3,730,373 A | 5/1973 | Kozbelt | |
| 3,788,928 A | 1/1974 | Wise | |
| 3,907,625 A | 9/1975 | Vogelsanger | |
| 3,943,334 A | 3/1976 | Sturm | |
| 3,998,682 A | 12/1976 | Harmsen | |
| 4,449,038 A | 5/1984 | Reich et al. | |
| 4,510,004 A | 4/1985 | Hawerkamp | |
| 4,530,521 A | 7/1985 | Nyffeler et al. | |
| 4,622,087 A | 11/1986 | Ansell | |
| 4,626,308 A | 12/1986 | Ansell | |
| 4,628,966 A | 12/1986 | Kanao | |
| 4,630,846 A | 12/1986 | Nishino et al. | |
| 4,770,442 A | 9/1988 | Sichler | |
| 4,842,305 A | 6/1989 | Kistenich et al. | |
| 4,865,674 A | 9/1989 | Durkin | |
| 4,927,183 A | 5/1990 | Steinmetz et al. | |
| 4,927,184 A * | 5/1990 | Bourjot et al. ............ | 285/21.1 |
| 4,929,817 A | 5/1990 | Mito et al. | |
| 5,046,531 A | 9/1991 | Kanao | |
| 5,107,098 A | 4/1992 | D'Auria | |
| 5,150,922 A | 9/1992 | Nakashiba et al. | |
| 5,169,176 A | 12/1992 | Brossard | |
| 5,324,920 A | 6/1994 | Nakao | |
| 5,364,130 A | 11/1994 | Thalmann | |

(Continued)

FOREIGN PATENT DOCUMENTS

AT    239018    3/1965

(Continued)

*Primary Examiner*—James M. Hewitt
(74) *Attorney, Agent, or Firm*—Roylance,Abrams,Berdo & Goodman, L.L.P.

(57) ABSTRACT

An electrofusion joint assembly includes a meltable member, such as a pipe or fitting, and a heating element secured to the pipe or fitting. The pipe or fitting may be tapered to facilitate receiving another pipe to form an electrofusion weld joint. Fasteners are used to secure the heating element and extend through a meltable zone and into a non-melt zone. Power supplied to the pipe melts the pipe proximal the heating element.

17 Claims, 8 Drawing Sheets

U.S. PATENT DOCUMENTS

| | | | |
|---|---|---|---|
| 5,369,248 A | 11/1994 | Dufour et al. | |
| 5,390,704 A | 2/1995 | Kanao | |
| 5,433,484 A | 7/1995 | Ewen et al. | |
| 5,454,061 A | 9/1995 | Carlson | |
| 5,674,588 A * | 10/1997 | Porfido et al. | 428/136 |
| 5,687,996 A | 11/1997 | Steinmetz et al. | |
| 5,824,179 A | 10/1998 | Greig | |
| 5,836,621 A | 11/1998 | Campbell | |
| 5,911,895 A | 6/1999 | Porfido et al. | |
| 5,988,689 A | 11/1999 | Lever | |
| 6,131,954 A * | 10/2000 | Campbell | 285/21.1 |
| 6,135,508 A * | 10/2000 | Genoni et al. | 285/21.2 |
| 6,250,686 B1 * | 6/2001 | Becker et al. | 285/21.2 |
| 6,428,054 B1 * | 8/2002 | Zappa et al. | 285/123.15 |
| 6,781,099 B1 * | 8/2004 | Krah | 219/544 |

FOREIGN PATENT DOCUMENTS

| | | |
|---|---|---|
| AU | 217080 | 11/1956 |
| DE | 1479231 | 3/1969 |
| DE | 2207060 | 6/1974 |
| DE | 2817243 | 10/1979 |
| DE | 3213551 | 10/1983 |
| DE | 3226575 | 3/1984 |
| DE | 3103305 | 6/1984 |
| DE | 3437940 | 4/1986 |
| DE | 263022 | 12/1988 |
| DE | 4214279 | 11/1993 |
| EP | 33788 | 8/1981 |
| EP | 0780620 | 6/1997 |
| GB | 939664 | 10/1963 |
| GB | 1121850 | 7/1968 |
| GB | 1214632 | 12/1970 |
| GB | 2135746 | 9/1984 |
| GB | 2135747 | 9/1984 |
| JP | 4636118 | 10/1971 |
| JP | 2190694 | 7/1990 |
| JP | 5164286 | 6/1993 |
| JP | 5164288 | 6/1993 |
| JP | 5272689 | 10/1993 |
| JP | 6281078 | 10/1994 |
| JP | 7253186 | 10/1995 |
| JP | 7332571 | 12/1995 |
| JP | 8156018 | 6/1996 |
| JP | 9257183 | 9/1997 |
| JP | 9280466 | 10/1997 |
| JP | 10246382 | 9/1998 |
| JP | 11315987 | 11/1999 |
| RU | 24681 | 11/1969 |

* cited by examiner

ELECTROFUSION SOCKET FORMING SYSTEM

CROSS-REFERENCE TO RELATED APPLICATION

This application is a divisional application of Ser. No. 09/935,337, filed Aug. 23, 2001, which is now U.S. Pat. No. 6,781,099.

This application claims the benefit under 35 U.S.C. § 119(e) of provisional application Ser. No. 60/274,661, filed Mar. 12, 2001, which is hereby incorporated by reference in its entirety.

FIELD OF THE INVENTION

The invention relates to an assembly for and a method of making an electrofusion joint including a meltable member having a heating element.

BACKGROUND OF THE INVENTION

Electrofusion joints have been developed and used for joining pipe used in a variety of applications, such as sewage system piping. Typically, when joining two pipes directly together using an electrofusion joint, one end of a first pipe has a heating element embedded therein. A second pipe is then inserted into the end of the first pipe in which the heating element was embedded. An electric power source supplies an electric current to the heating element embedded in the first pipe. The supply of power to the heating element causes the heating element to produce heat, thereby melting the pipe material in both the first and second pipes in the vicinity of the heating element. The melted pipe material flows together and forms a homogenous joint following a cooling down period, thereby forming a strong joint between the two pipes. The heating element may also be embedded in a fitting, such as a double socket fitting, for joining two pipes through the use of a fitting. Examples of existing electrofusion joints are disclosed in U.S. Pat. No. 3,062,940 to Bauer et al., U.S. Pat. No. 4,530,521 to Nyffeler et al., and U.S. Pat. No. 5,836,621 to Campbell, which are hereby incorporate by reference in their entirety.

When joining pipe using existing electrofusion sockets, the pipe material in the vicinity of the heating element melts and the heating element tends to move or "swim" within the melted pipe material. During such movement, one portion of the heating element may come into contact with another portion causing the circuit to short out. A short circuit causes loss of power to the heating element, thereby prematurely ending formation of the electrofusion joint. This results in a weak joint between the two pipe members. Movement of the heating element becomes more pronounced, and thus a larger problem, with increasing pipe diameter.

In addition, when joining pipe using electrofusion, difficulties are encountered in preparing the pipe for the welding process due to the variation in tolerances encountered in pipe diameters. The variation in pipe diameters may lead to a bell end of a first pipe having an inner diameter too small to receive a second pipe, or, alternatively, the bell end of a first pipe having an inner diameter too large to form a proper fit with the socket end of a second pipe, such that a bad joint is formed. This problem becomes more pronounced as pipe diameters increase since variation in the range of pipe size tolerances increases with pipe diameter.

Thus, there is a continuing need to provide improved assemblies for and methods of making electrofusion joints.

SUMMARY OF THE INVENTION

Surprisingly, it has been found that provision of an electrofusion joint assembly including a meltable member and a heating element attached to the meltable member by at least one fastener in accordance with the present invention prevents substantial movement of the heating element during formation of the electrofusion joint.

In accordance with one embodiment of the present invention, an electrofusion joint assembly is provided including a first pipe having a spigot end, a second pipe having a bell end for receiving the spigot end of the first pipe, a heating element embedded in either the spigot end of the first pipe or in the bell end of the second pipe for creating a melt zone proximal the heating element when supplying the heating element with power, and at least one fastener extending through a meltable zone and into a non-melt zone of the embedded end of the pipe for securing the heating element in the embedded end of the pipe to prevent substantial movement of the heating element when supplying the heating element with power for making the electrofusion joint.

In still another embodiment, an electrofusion joint assembly is provided including a first pipe and a second pipe to be connected, a fitting having first and second ends adapted for receiving the first and second pipes, a heating element embedded in each of the first and second fitting ends for creating a melt zone proximal the heating element when supplying the heating element with power, and at least one fastener extending through a meltable zone and into a non-melt zone of the fitting for securing the heating element in the first and second ends of the fitting to prevent substantial movement of the heating elements when supplying the heating elements with power for making the electrofusion joint.

In still another embodiment, a method of making an electrofusion joint is provided including providing a first pipe having a spigot end, providing a second pipe having a bell end, embedding a heating element and a plurality of fasteners in either the spigot end of the first pipe or in the bell end of the second pipe, the at least one fastener extending through a meltable zone and into a non-melt zone of the embedded pipe, inserting the spigot end of the first pipe into the bell end of the second pipe, creating a melt zone proximal the heating element by supplying power to the heating element, the heating element being prevented from substantially moving when creating the melt zone by the at least one fastener extending through the melt zone and into the non-melt zone of the embedded pipe; and terminating the supply of power to the heating element to fuse the first and second pipes together.

In another embodiment of the present invention, a second member has a tapered end for receiving a first member. The inner surface of the second member and the outer surface of the first member are substantially non-parallel. A ring positioned around the outer surface of the second member compresses the second member proximal the first member, thereby eliminating poor joint make-up due to variations in pipe sizes due to allowable tolerances.

In a further embodiment of the present invention, multiple power sources are used to form the electrofusion joint. Separate heating elements are each powered by an individual power source, thereby reducing weld time and avoiding breakdown of the electrical circuit that may cause poor electrofusion weld joints, particularly in large diameter pipe.

Other advantages and salient features of the invention will become apparent from the following detailed description, which, taken in conjunction with the annexed drawings, discloses preferred embodiments of the invention.

BRIEF DESCRIPTION OF THE DRAWINGS

Referring now to the drawings that form a part of the original disclosure.

DETAILED DESCRIPTION OF THE INVENTION

Figure 1:
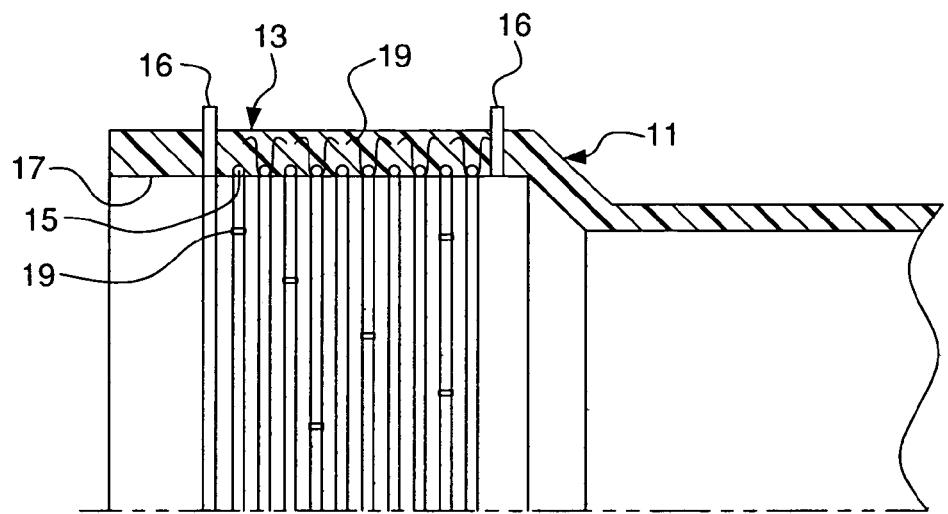
FIG. 1 is a cross-sectional view of a bell portion of a pipe having a heating element secured therein by fasteners.

As seen in FIGS. 1–16, the present invention relates to assemblies for and methods of making an electrofusion weld joint. A meltable member, such as a pipe member as shown in FIG. 1 or a double socket fitting as shown in FIG. 11, has a heating element and at least one fastener attaching the heating element to the meltable member. The meltable member may be a pipe, fitting or any other suitable member in which the heating element is to be embedded. Preferably, the meltable member is a thermoplastic. The methods and assemblies described herein may be used to create an electrofusion weld joint for pipe of any diameter. Preferably, meltable members having diameters of eighteen inches and larger are used to make an electrofusion joint.

As shown in FIG. 1, a bell portion 13 of a pipe 11 has a heating element 15 embedded therein. Preferably, the heating element 15 is embedded from the inner surface 17 of the bell portion 13 of the pipe 11. At least one fastener 19 is used to secure the heating element 15 within the pipe 11.

Figure 2:
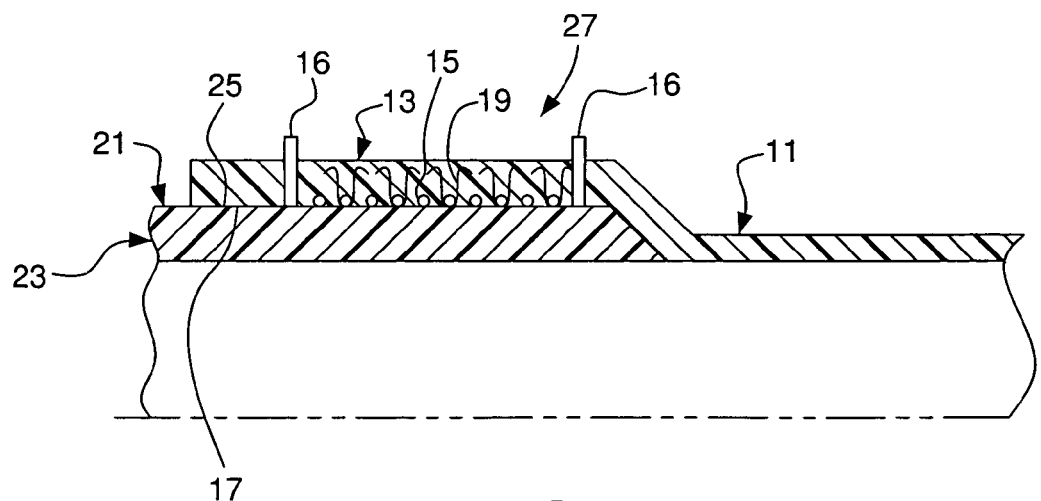
FIG. 2 is a cross-sectional view of an electrofusion joint assembly having a bell portion of a first pipe with an embedded spiral heating element and a spigot portion of a second pipe inserted in the bell portion of the first pipe.

An electrofusion joint assembly 27 for joining a first pipe 21 and a second pipe 11 is shown in FIG. 2. The second pipe 11 has a bell portion 13 that receives a spigot end 23 of first pipe 21. An inner surface 17 of the bell portion of the second pipe 11 mates with an outer surface 25 of the spigot end 23 of the first pipe. A heating element 15 may be attached to and embedded in either the inner surface 17 of the bell portion 13 of the second pipe 11 or the outer surface 25 of the spigot end 23 of the first pipe 21. Terminals 16 of the heating element are connected to a power source for supplying electrical current to the heating element to produce an electrofusion weld joint between the first and second pipes. At least one fastener 19 is used to secure the heating element 15 within the embedded portion of the pipe.

Figure 3:
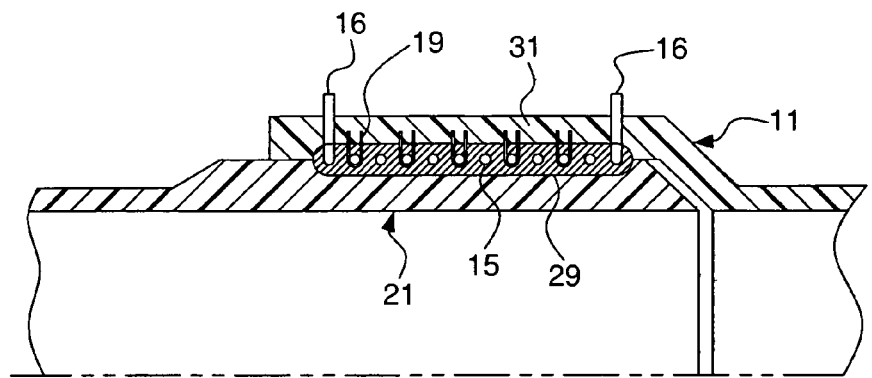
FIG. 3 is the cross-sectional view of the electrofusion joint assembly of FIG. 2 showing a melt zone.
Figure 4:
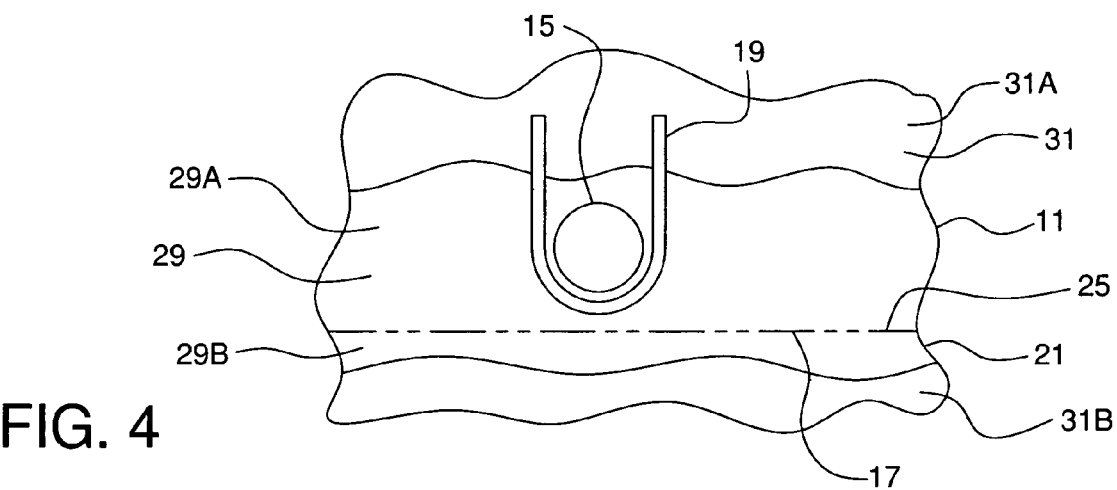
FIG. 4 is an enlarged, partial elevational view of a heating element embedded in a pipe secured therein by a fastener extending through a melt zone and into a non-melt zone.

As shown in FIGS. 3 and 4, a predetermined melt zone 29 is created when electrical current is supplied to the heating element 15. The predetermined melt zone 29 is the area that becomes molten or melts as a result of the heat generated by the heating element proximal the heating element, with melt zone portions 29A and 29B (together melt zone 29) created in both the first and second pipes, respectively. The areas 31A and 31B (together non-melt zone 31) outside the predetermined melt zones are non-melt zone portions of the first and second pipes, respectively, which do not melt or become molten from heat emanating from the heating element. The material within the predetermined melt zone becomes molten and flows during the electrofusion welding process.

The fastener 19 extends through the predetermined melt zone into a non-melt zone portion 31 of the pipe, thereby substantially preventing movement of the heating element when the pipe material in the vicinity of the heating element becomes molten. As shown, the ends of the fastener 19 extend into the non-melt zone portion 31 to secure the fastener during the electrofusion welding process, so that when the melt zone begins to flow substantial movement of the fastener and the heating element is prevented due to the fastener extending into the non-melt zone and anchoring the heating element to resist movement. The fastener 19 may have any desired shape. Although shown having a "U-shape", fastener 19 may have a "J" or fishhook shape among others, for example.

A fastener 19, as shown in FIGS. 3 and 4, is used to attach the heating element 15 to the second pipe 11 to substantially prevent movement of the heating element while the surrounding material in the melt zone is heated and becomes molten during the process of forming an electrofusion weld joint. Preferably, the fastener is metallic, such as stainless steel, brass or aluminum. The fastener may have any desired shape, but a substantially U-shaped fastener, as shown in FIG. 3, or a Y-shaped fastener is preferred. An end of the fastener 19 prevents the heating element from substantially moving during the electrofusion welding process, thereby ensuring that one portion of the heating element will not touch another portion and cause the circuit to short out during the electrofusion welding process. The fastener 19 extends through the predetermined melt zone 29 into a non-melt zone portion 31. By anchoring the fastener in the non-melt zone portion, the fastener is secured in a solid material that does not become molten during the welding process, thereby ensuring that the fastener, and therefore the heating element, does not substantially move during the electrofusion welding process.

The length of the fasteners depends on the extent of the melt zone. The size of the melt zone depends on several factors, some of which include the material in which the heating element is embedded, the size of the heating element, the shape of the heating element, the amount of power supplied to the heating element, and the length of time power is supplied to the heating element. Based on the size of the melt zone, the length or size of the fasteners may be easily determined.

Figure 5:
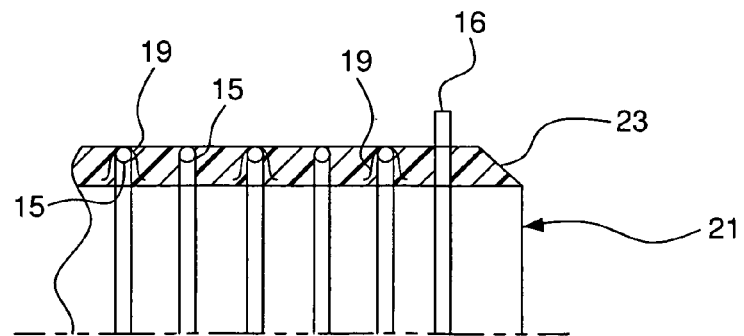
FIG. 5 is a cross-sectional view of a spigot end of a pipe having a heating element secured therein by fasteners.

Alternatively, as shown in FIG. 5, an electrofusion joint assembly may be constructed having the heating element 53 attached to the spigot end of the first pipe 21.

Figure 6:
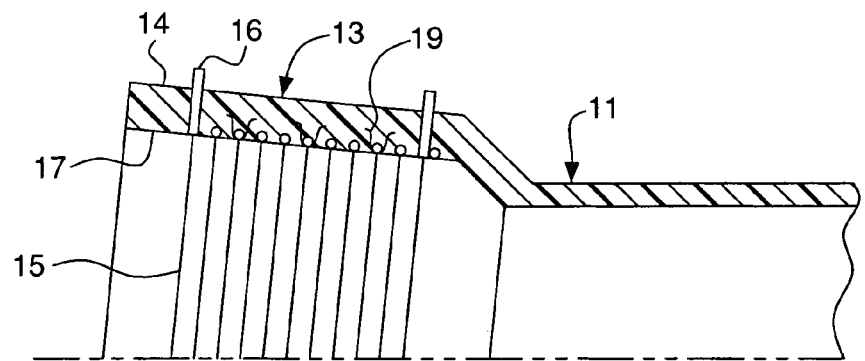
FIG. 6 is a cross-sectional view of a tapered bell portion of a pipe having a heating element secured therein by fasteners.
Figure 7:
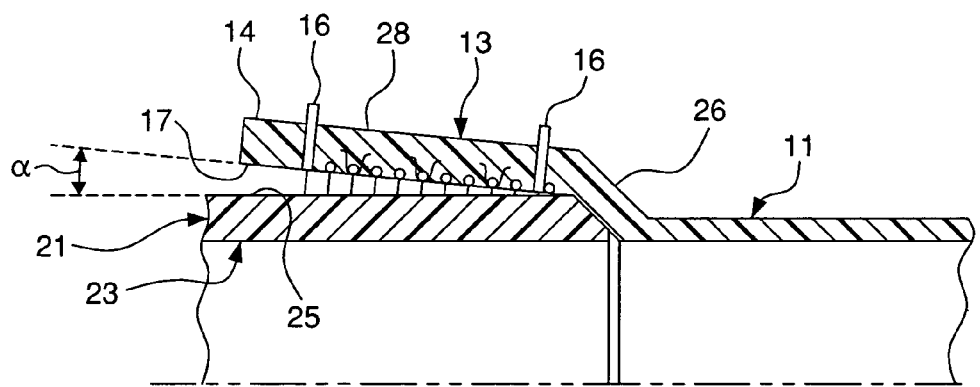
FIG. 7 is a cross-sectional view of the tapered bell portion of FIG. 6 receiving a spigot end of a second pipe.

As shown in FIGS. 6 and 7, the bell portion 13 of second pipe 11 may be tapered 14 to facilitate insertion of a spigot end 23 of a first pipe 21 and to control or eliminate the gap between the pipe where the electrofusion joint is to be formed.

As shown in FIG. 7, inner surface 17 of bell portion 13 of second pipe 11 is substantially non-parallel and forms an angle with outer surface 25 of spigot portion 23 of first pipe 21, thereby creating a gap between first and second pipes. The taper angle α may be between about 3 and 10 degrees. Heating element 15 is attached to second pipe 11. Alternatively, heating element may be attached to the spigot end of first pipe 21. A tensioning ring 97 (FIG. 8) is positioned around the outer surface of second pipe 11 to compress the second pipe toward first pipe 21, thereby closing the gap between the first and second pipes to ensure a more uniform electrofusion weld joint.

Figure 8:
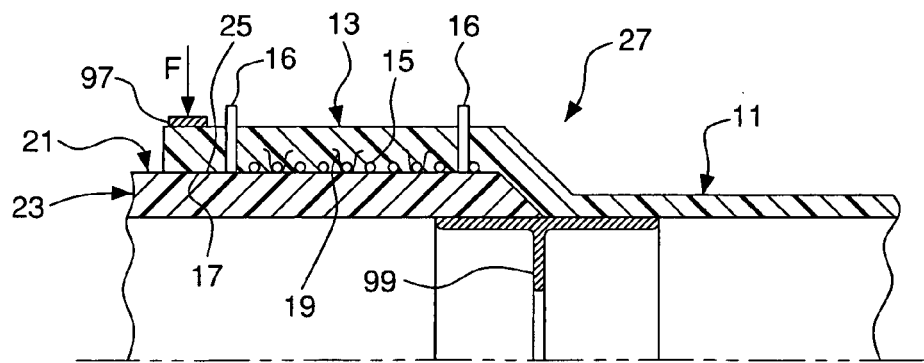
FIG. 8 is a cross-sectional view of the electrofusion joint assembly of FIG. 7 with a tensioning ring and support member reducing the taper of the bell portion.

A tensioning ring 97 may be used to force the inner surface 17 of the bell portion 13 of the second pipe 11, as shown in FIG. 7, proximal the outer surface 25 of the spigot portion 23 of the first pipe 21, as shown in FIG. 8. Decreasing the gap between the two mating surfaces provides a stronger electrofusion weld joint since the closer proximity of the mating surfaces enables the molten pipe material produced during the welding procedure to flow together to form a more homogenous joint. As shown in FIG. 8, the tensioning ring 97 is positioned around the bell end 13 of the second pipe 11, as shown in FIG. 8. A force F is applied to the tensioning ring to compress the inner surface 17 of the bell end proximal the outer surface 25 of the spigot end to form a stronger joint. Preferably, to facilitate bending of the tapered portion 14 of the second pipe, the second leg 26 of the taper is 20% thicker than the first leg 28. A support member 99 may be inserted within the joint assembly 27 to resist the downward force created by the tensioning ring. The support member 99 is inserted within the first and second pipes during the electrofusion welding procedure to provide support to the members against the compressive force imparted by the tensioning ring. The tensioning ring 97 and support member 99 may also be used to facilitate making an electrofusion joint for non-tapered pipe configurations.

A heating element 15 and at least one fastener 19 are embedded in either the bell end 13 of the second pipe 11 or the spigot end 23 of the first pipe 21. More than one heating element may be embedded in the pipe end. Each heating element is powered by an individual power source, thereby avoiding breakdown of the electrical circuit that may cause poor electrofusion weld joints. The fastener 19 extends through a predetermined melt zone into a non-melt zone portion of the embedded pipe. The spigot end 23 of the second pipe 21 is inserted into the bell end 13 of the first pipe 11. Terminals 16 of the heating element 15 are connected to a power source. A predetermined melt zone proximal the heating element 15 is created by supplying electrical current from the power source to the heating element. The fasteners 19 prevent the heating element 15 from substantially moving when creating the predetermined melt zone because the fastener extends through the predetermined melt zone into the non-melt zone portion 31 of the embedded pipe. The electrical current supplied to the heating element 15 causes thermal fusion at the mating surfaces of the first and second pipes. The thermal resistance of the heating element 15 causes the heating element to increase in temperature and to emit heat. The emitted heat causes the pipe material in the predetermined melt zone 21 to become molten. The supply of electrical current to the heating element is terminated so that the molten material within the predetermined melt zone that has flown together and filled cavities between the two pipes cools and fuses the first and second pipes together.

The heating element may be embedded within a meltable member by any suitable means. One method is to co-extrude the meltable member and the heating element at the same time, so that the pipe is formed with an embedded heating element. Another method of providing an embedded heating element is to melt or soften the meltable member to embed the heating element into such member. In this embodiment, the heating element is placed within an inserting ring 93, shown in FIG. 9. The inserting ring 93 may have a pocket to hold the heating element. The inserting ring is then positioned within the member in which the heating element is to be embedded, such as the bell portion of the first pipe shown in FIG. 1 or the first and second ends of the socket fitting 63 shown in FIG. 11. The element is attached to the member with at least one fastener, to initially hold the heating element in position on the member.

The fastener may be inserted into the member by any method. If the fastener is a U-shaped staple, it may be inserted using a powered staple gun, for example. If a J-shaped or fishhook-shaped fastener is used, the fastener may be inserted using a hammer or similar tool. The inserting ring is then removed from the member, leaving the heating element and fastener fastened to the member. At least one more fastener, preferably fasteners, are then inserted into the member to more securely fix the heating element within the member. A welding ring 95 is then positioned adjacent to the member in which the heating element is securely fixed. The welding ring is heated to soften the member proximal the welding ring, thereby causing the heating element and the fasteners to become embedded in the softened pipe. Heating of the welding ring is then terminated and the welding ring is removed from the pipe or fitting. As the pipe or fitting is allowed to cool, the softened material hardens, thereby retaining the embedded the heating element and the fasteners in the pipe.

Figure 9:
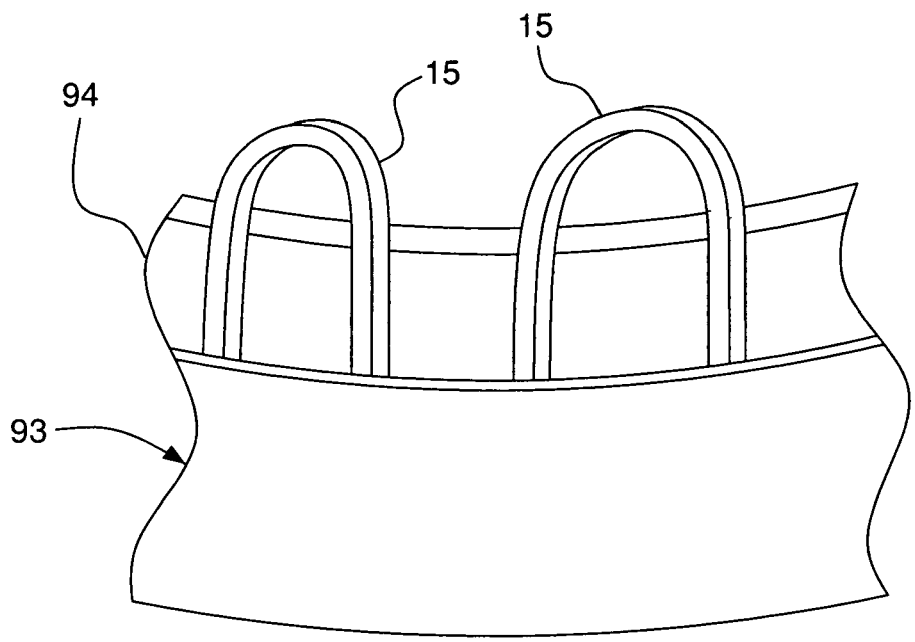
FIG. 9 is a partial perspective view of an inserting ring holding a meandering heating element.

An inserting ring 93 may be used to assist in initially fastening a heating element to a member in which the heating element is to be embedded. As shown in FIG. 9, the inserting ring 93 releasably holds the 15 heating element so that the heating element may be initially fastened to the inner surface 17 of pipe 11 within which the heating element is to be embedded. Preferably, the inserting ring 93 is a cylindrical ring having a groove 94 at one end for releasably holding the heating element. The inserting ring 93 is sized to fit against the surface of the member to which the heating element is to be embedded. For the pipe shown in FIG. 1, inserting ring 93 is sized such that the heating element is proximal inner surface 17 of bell portion 13 of pipe 11 when initially fastening the heating element to the pipe.

Figure 10:
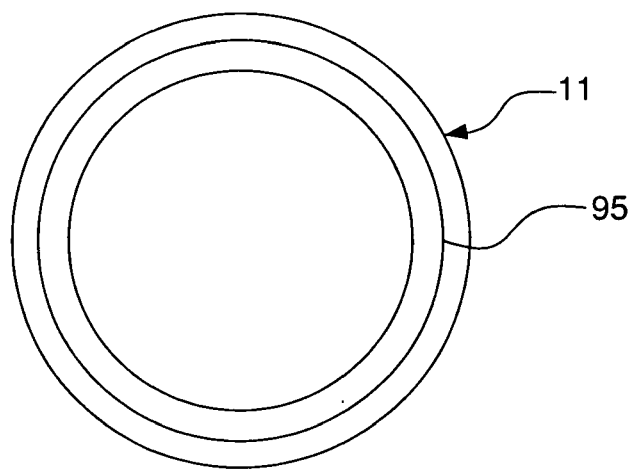
FIG. 10 is a front view of a welding ring received within a bell portion of a pipe.
Figure 11:
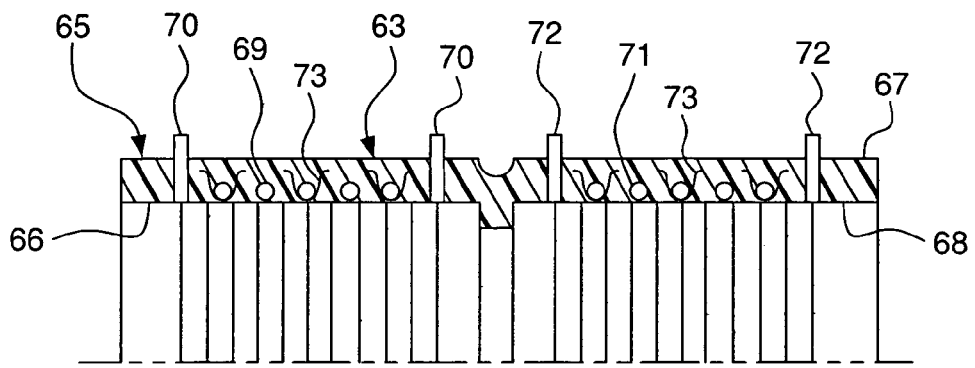
FIG. 11 is a cross-sectional view of a double socket fitting having two separate heating elements secured therein by fasteners.

A welding ring 95, as shown in FIG. 10, is sized and shaped fit against the heating element when it is initially fastened to a member in which the heating element is to be embedded. As shown in FIG. 10, the welding ring 95 is inserted within the bell portion of the pipe 11 where the heating element is initially fastened. The welding ring 95 is then heated, by a welding torch for example, to soften the material in the pipe so that the heating element and fasteners will sink into the softened material, thereby embedding themselves within the material as it hardens.

In another embodiment, as shown in FIGS. 11–14, an electrofusion joint assembly 57 may be constructed with a double socket fitting 63 to form a joint between a first pipe 59 and a second pipe 61. The double socket fitting 63 has a first heating element 69 and a second heating element 71 embedded therein. The double socket fitting 63 has a first end 65 and a second end 67 for receiving first and second pipe members. The first and second ends have first and second inner surfaces 66 and 68, respectively. The first end 65 of the socket fitting 63 has the first heating element 69 embedded therein. The second end 67 of the socket fitting 63 has the second heating element 71 embedded therein. Preferably, the heating elements are embedded from the inner surfaces 66 and 68 at each of the first and second ends of the socket fitting 63. At least one fastener 73 is used to secure each of the heating elements 69 and 71 within the first and second ends 65 and 67 of the socket fitting 63. Preferably, the heating element is embedded within the socket fitting as described above.

Figure 13:
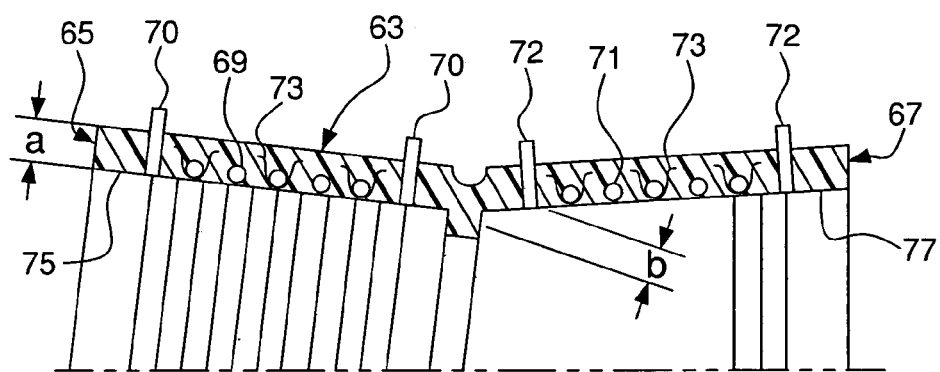
FIG. 13 is a cross-sectional view of a tapered double socket fitting having two separate heating elements secured therein by fasteners.

As shown in FIG. 13, the double socket fitting 63 may have a tapered first end 75 and a tapered second end 77 to facilitate receiving first and second pipe members to make an electrofusion joint assembly. Preferably, the taper is about 3 to 10 degrees. Preferably, to facilitate bending of the tapered portions 75 and 77, the second leg of the tapered portion "a" is approximately 20% thicker than the first leg "b".

Figure 12:
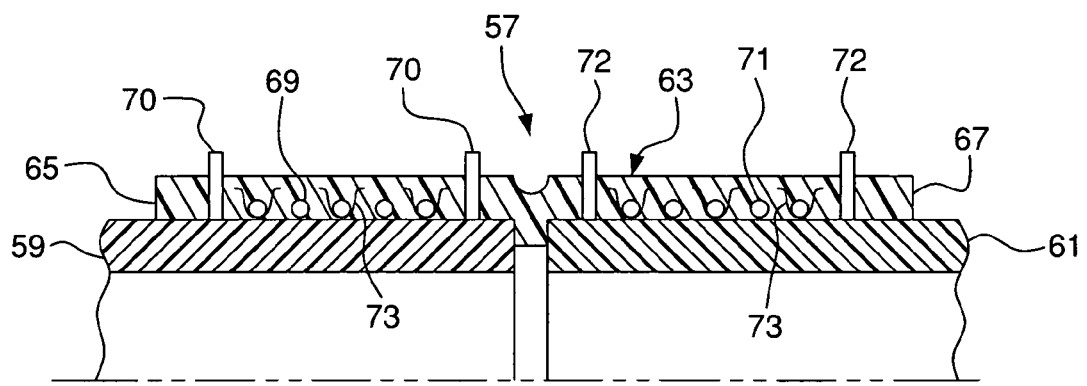
FIG. 12 is a cross-sectional view of an electrofusion joint assembly having a double socket fitting with two separate embedded heating elements, and two pipes inserted in opposite ends of the socket fitting.

An electrofusion joint assembly 57 for joining a first pipe 59 and a second pipe 61 using a socket fitting 63 is shown in FIG. 12. The socket fitting 63 has a first end 65 and a second end 67 that receive the first and second pipes 59 and 61. The first end 65 of the socket fitting 63 has an inner surface 66 that mates with the outer surface 60 of the first pipe 59 when the pipe is inserted into the socket fitting to make-up the electrofusion joint assembly 57. The second end 67 of the socket fitting 63 has an inner surface 68 that mates with the outer surface 62 of the second pipe 61 when the pipe is inserted into the socket fitting to make up the electrofusion joint assembly 57. A first heating element 69 is embedded in the inner surface 66 of the first end 65 of the socket fitting 63 and a second heating element 71 is embedded in the inner surface 68 of the second end 67 of the socket fitting. More than one heating element may be embedded in each of the socket fitting ends. First and second terminals 70 and 72 of the heating elements are connected to a power source (not shown) that supplies electrical current to the heating element to produce an electrofusion weld joint between the socket fitting 63 and the first and second pipes 59 and 61. Preferably, each heating element is connected to an individual power source.

Figure 14:
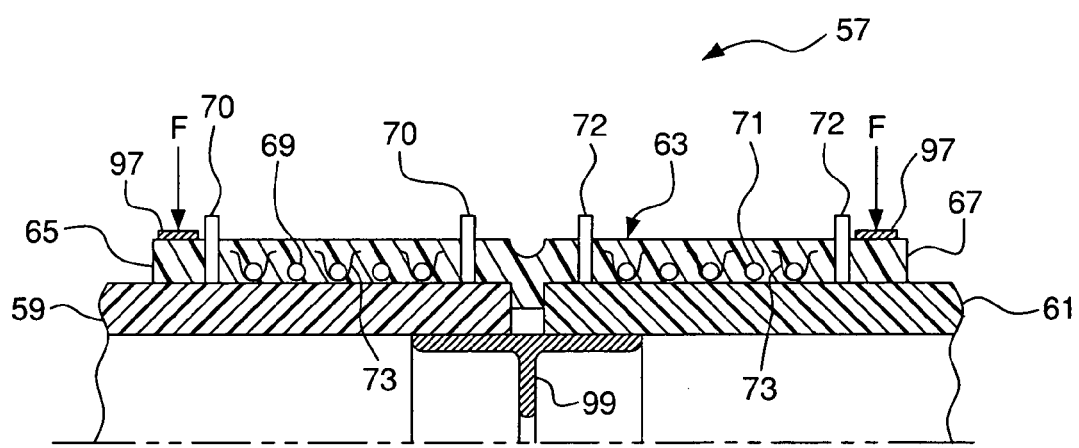
FIG. 14 is a cross-sectional view of an electrofusion joint assembly of FIG. 13 having a tapered double socket fitting with a pipe inserted in each end, and a tensioning ring and support member reducing the taper of the each socket end.

At least one fastener 73 is used to attach each of the first and second heating elements 69 and 71 to the inner surfaces 66 and 68 of the socket fitting 63. The fasteners extend through a predetermined melt zone and into a non-melt zone portion of the fitting, as shown in FIG. 3. The first pipe is inserted in the first fitting end and the second pipe is inserted into the second fitting end. The first and second socket ends may be tapered, such as shown in FIG. 13, to facilitate insertion of the pipe into the socket fitting ends. Preferably, the taper is about 3 to 10 degrees. A predetermined melt zone is created proximal each of the heating elements by supplying electrical current to each of the heating elements. The heating elements are prevented from substantially moving when creating the predetermined melt zone by the fasteners extending through the melt zone into the non-melt zone portion of the socket fitting. The supply of electrical current to the heating elements is terminated, allowing the molten material within the melt zones that has moved and filled cavities between the socket fitting and the two pipes to cool and fuse the first and second pipes and the socket fitting together. As shown in FIG. 14, a tensioning ring 97 and support member 99 may also be used at both ends of a socket fitting, as described previously with regard to FIG. 8.

Figure 15:
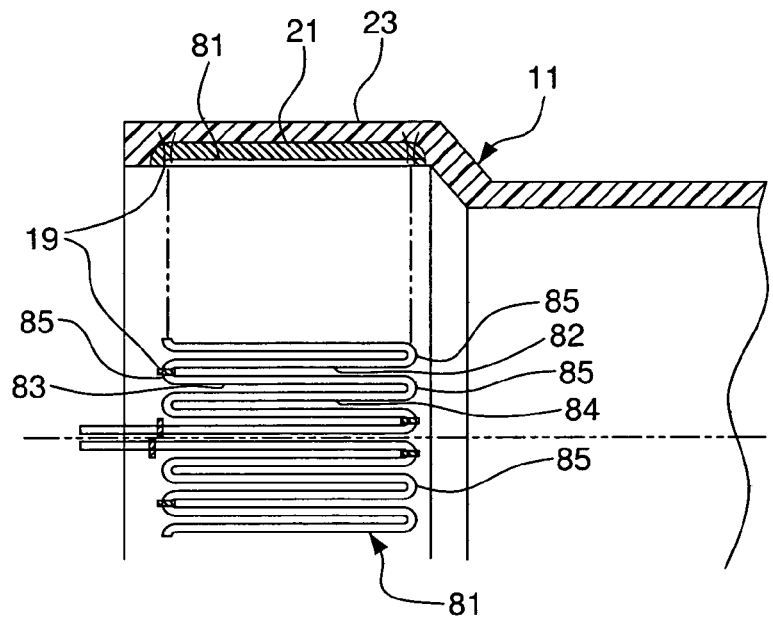
FIG. 15 is a cross-sectional view of a bell portion of a pipe having a meandering heating element.
Figure 16:
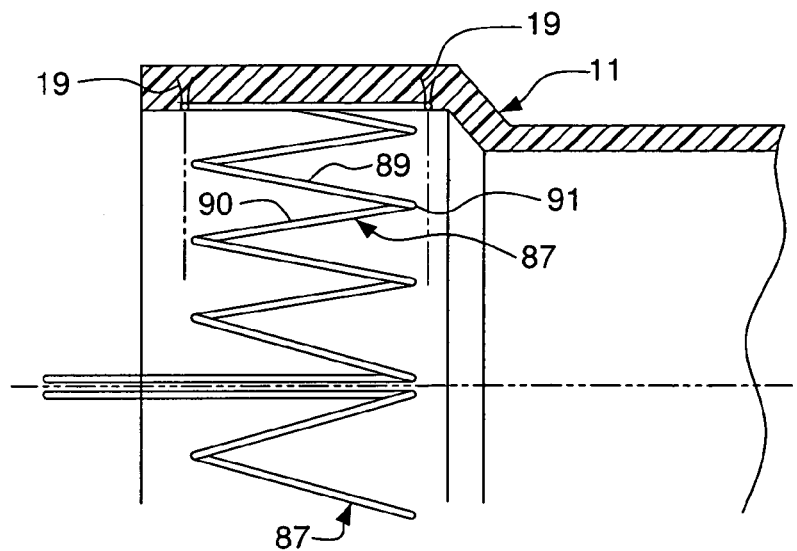
FIG. 16 is a cross-sectional view of a bell portion of a pipe having a zigzag heating element.

A heating element, such as heating element 15 shown in FIG. 1, is preferably embedded in a meltable member that is to make up an electrofusion weld joint assembly. The heating element has terminals, such as terminals 16 shown in FIG. 1, that are connected to a power source, which supplies electrical current to the heating element to produce an electrofusion weld joint. The heating element may have any geometrical configuration. Preferably, the heating element has a substantially helical shape as shown in FIG. 3, a substantially meandering shape as shown in FIG. 15, or a substantially zigzag shape as shown in FIG. 16. More than one heating element may be used to make-up the electrofusion weld joint.

The substantially helical shaped heating element 15 shown in FIG. 3 winds circumferentially around the inner surface 17 of the bell portion 13 of the second pipe 11 in which the heating element is embedded. The helical shape has a substantially constant radius from the center of the pipe while it winds around the inner surface of the bell.

The substantially meandering shaped heating element 81, as shown in FIG. 15, has an S-shaped pattern. The meandering heating element 81 runs longitudinally along the embedded member for a fixed length forming a first leg 82 of the S before making a substantially arcuate 180 degree bend 85. The heating element then runs the fixed length in a direction longitudinally opposite of the first leg 82 to form the second leg 83 of the S before making another substantially arcuate 180 degree bend 85. The heating element then runs in a direction longitudinally opposite that of the second leg 83 to form the third leg 84 of the S-shaped pattern. This pattern is repeated along the inner surface of the member in which the heating element is embedded. Preferably, the heating element is secured within the member with a fastener at every bend 85 and one near where the heating element exits the member.

The substantially zigzag shaped heating element 87, as shown in FIG. 16, has a V-shaped pattern. The zigzag heating element 87 runs angularly to the longitudinal axis of the embedded member for a fixed length to form the first leg 89 of the V. At the end of the first leg, the heating element makes an angled bend 91 to form the apex of the V. The heating element then runs the fixed length 89 in a direction opposite to the longitudinal direction of first run to form the second leg 90 of the V, which completes the V-shaped pattern. This pattern is repeated along the inner surface of the member in which the heating element is embedded. Preferably, the heating element is secured within the member with a fastener at every bend 91 and one near where the heating element exits the member.

Figure 17:
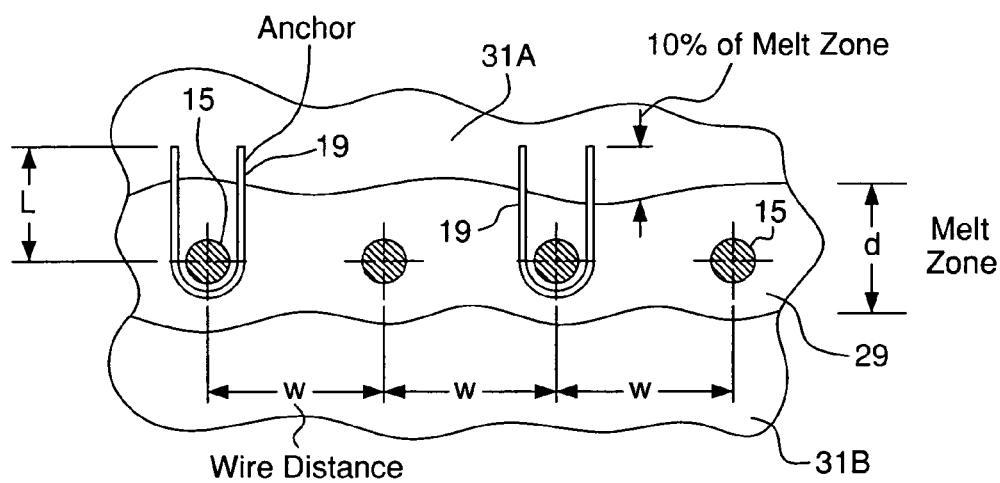
FIG. 17 is a cross-sectional view of an embedded heating element showing the size of the melt zone.

The length L of the fastener 19 to be used depends on the thickness "d" of the melt zone 29, as detailed in FIG. 17. In turn, the thickness "d" of the melt zone depends on the distance "w" between wires. The melt zone thickness "d" must be at least as thick as the wire distance "w". Preferably, the amount of the fastener 19 extending into the non-melt zone is at least 10% of the melt zone thickness. Therefore, the length "L" of the fastener is preferably 110% of the thickness "d" of the melt zone. Typically, the wire distance w is known prior to constructing an electrofusion joint in accordance with the present invention, such that an adequately sized fastener 19 is used.

Figure 18A:
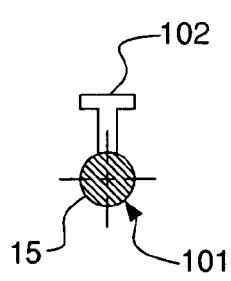
FIGS. 18A, 18B and 18C is a cross-sectional view of T-shaped, barb shaped and I-shaped fasteners pre-attached to a heating element.
Figure 18B:
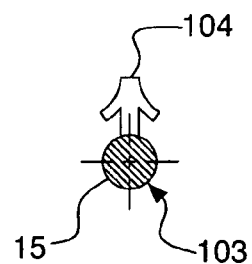
Figure 18C:
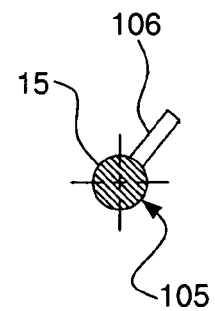

As shown in FIGS. 18A, 18B and 18C, a heating element 15 may have a pre-attached fastener. FIG. 18A shows a heating element assembly 101 with a pre-attached T-shaped fastener 102. FIG. 18B shows a heating element assembly 103 with a pre-attached barbed fastener 104. FIG. 18C shows a heating element assembly 105 with a pre-attached I-shaped fastener 106. The pre-attached fastener may be attached to the heating element with any conventional method, such as clamping, riveting welding, and soldering. The heating element assembly is attached and embedded in a heatable member as previously described for a heating element without a pre-attached fastener.

While advantageous embodiments have been chosen to illustrate the invention, it will be understood by those skilled in the art that various changes and modifications may be made therein without departing from the scope of the invention as defined in the appended claims.

What is claimed is:

1. An assembly for making an electrofusion joint, comprising:
   a first pipe and a second pipe;
   a fitting having first and second ends adapted for receiving said first and second pipes;
   a heating element embedded in each of said first and second fitting ends for creating a predetermined melt zone proximal said heating element when supplying said heating element with electrical current; and
   at least one fastener extending through said predetermined melt zone into a non-melt zone portion of said fitting for securing said heating element in said first and second ends of said fitting to prevent substantial movement of said heating elements when said predetermined melt zone is molten.

2. The assembly of claim 1, wherein said heating element has a substantially zigzag shape.

3. The assembly of claim 1, wherein said heating element has a substantially helical shape.

4. The assembly of claim 1, wherein said first and second pipes are formed of thermoplastic polymers.

5. The assembly of claim 1, wherein said fitting is formed of a thermoplastic polymer.

6. The assembly of claim 1, wherein said at least one fastener is metallic.

7. The assembly of claim 1, wherein said first and second ends of said fitting are tapered to facilitate receiving said first and second pipes.

8. The assembly of claim 7, wherein said taper is about 3 to 10 degrees.

9. The assembly of claim 1, wherein a plurality of heating elements are embedded in each of said first and second fitting ends for creating said melt zone proximal each of said plurality of heating elements when supplying each of said plurality of heating elements with power.

10. The assembly of claim 1, wherein said first and second pipes have a diameter of at least about eighteen inches.

11. A method of forming an electrofusion joint, comprising:
    providing a first pipe;
    providing a second pipe;
    providing a fitting having a first end and a second end adapted for receiving said first and second pipes;
    embedding a heating element and at least one fastener in each of said first and second ends of said fitting, said at least one fastener extending through a predetermined melt zone into a non-melt zone portion of said fitting;
    inserting said first pipe in said first fitting end;
    inserting said second pipe in said second fitting end;
    creating a predetermined melt zone proximal each of said heating elements by supplying electrical current to each of said heating elements, said heating elements being prevented from substantially moving when predetermined melt zone is molten by said at least one fastener extending through said predetermined melt zone into said non-melt zone portion of said fitting; and
    terminating said supplying electrical current to said heating elements to fuse said fitting and said first and second pipes together.

12. The method according to claim 11, wherein embedding a heating element comprises:
    (a) positioning a first heating element within an inserting ring;
    (b) positioning said inserting ring within said first end of said fitting;
    (c) inserting at least one of said plurality of fasteners to initially fasten said first heating element to said first end of said fitting;
    (d) removing said inserting ring;
    (e) inserting remaining plurality of fasteners to secure said first heating element within said first end of said fitting;
    (f) inserting a welding ring in said first end of said fitting;
    (g) heating said welding ring to melt said fitting proximal said welding ring, thereby causing said first heating element and said plurality of fasteners to sink into said melted fitting;
    (h) cooling said fitting, thereby embedding said first heating element and said plurality of fasteners within said fitting;
    (i) removing said welding ring; and
    (j) repeating steps (a) through (i) for embedding a second heating element in said second end of said fitting.

13. The method according to claim 11, wherein providing said fitting having said first and second ends comprises providing said fitting having tapered first and second ends.

14. The method according to claim 13, wherein providing said fitting having tapered first and second ends comprises providing said tapered first and second ends with a taper of substantially 3 to 10 degrees.

15. The method according to claim 13, further comprising positioning a tensioning ring around each of said first and second fitting ends; and forcing said first and second fitting ends proximal said first and second pipes with said tensioning ring after inserting said first and second pipes in said first and second fitting ends.

16. The method according to claim 15, further comprising positioning a support member within said first and second pipes before forcing said first and second fitting ends proximal said first and second pipes for supporting said first and second pipes and said fitting while applying said force with said tensioning ring.

17. The method according to claim 11, wherein providing said first and second pipes comprises providing said first and second pipes having diameters of at least about eighteen inches.

* * * * *